United States Patent [19]
Warner et al.

[11] Patent Number: 5,621,205
[45] Date of Patent: Apr. 15, 1997

[54] PHOTOELECTRIC SENSOR HAVING AN ENHANCED DYNAMIC RANGE CONTROL CIRCUIT

[75] Inventors: Robert A. Warner, Oldsmar; Grant L. Smith, Lutz, both of Fla.

[73] Assignee: Tri-Tronics Company, Inc., Tampa, Fla.

[21] Appl. No.: 631,882

[22] Filed: Apr. 16, 1996

Related U.S. Application Data

[63] Continuation of Ser. No. 337,619, Nov. 10, 1994, abandoned.

[51] Int. Cl.⁶ .............................. G01J 1/32; H01J 40/14
[52] U.S. Cl. .................................. 250/205; 250/214 AG; 250/214 C; 250/221
[58] Field of Search ............................. 250/205, 214 AG, 250/214 B, 214 C, 221, 222.1, 573

[56] References Cited

U.S. PATENT DOCUMENTS

| | | |
|---|---|---|
| 3,603,799 | 9/1971 | Nobusawa . |
| 3,859,539 | 1/1975 | Allington . |
| 3,947,117 | 3/1976 | Basu et al. . |
| 4,025,440 | 5/1977 | Suga ........................................ 250/205 |
| 4,097,731 | 6/1978 | Kraus et al. . |
| 4,097,732 | 6/1978 | Kraus et al. . |
| 4,356,393 | 10/1982 | Fayfield . |
| 4,520,343 | 5/1985 | Koh et al. . |
| 4,644,341 | 2/1987 | Warner . |
| 4,733,398 | 3/1988 | Shibagaki et al. ........................ 372/31 |
| 4,736,097 | 4/1988 | Philip . |
| 4,879,461 | 11/1989 | Philip . |
| 4,906,832 | 3/1990 | Beeckel . |
| 4,965,548 | 10/1990 | Fayfield . |
| 4,981,362 | 1/1991 | deJong et al. ........................... 356/436 |
| 5,008,531 | 4/1991 | Ono et al. . |
| 5,281,810 | 1/1994 | Fooks et al. . |
| 5,283,424 | 2/1994 | Acquaviva et al. . |
| 5,302,944 | 4/1994 | Curtis ...................................... 340/653 |
| 5,336,882 | 8/1994 | Fooks et al. . |

OTHER PUBLICATIONS

Opcon 8215A–6501 Low Contrast Module Application Sheet (Undated).
Deitz Company Block, Diagram for Resistor Control, Nov. 18, 1980.
Accraply Part No. 9430 Schematic for Label Sensor, Jun. 28, 1983.

*Primary Examiner*—Stephone Allen
*Attorney, Agent, or Firm*—McDermott, Will & Emery

[57] ABSTRACT

The disclosed invention is a photoelectric sensor that is capable of resolving difficult low contrast sensing tasks by adjustment of the sensor's light source intensity, so as to prevent dark state saturation and extend the overall dynamic range of the sensor. The photosensor utilizes an enhanced dynamic (EDR™) control circuit that combines the light source and offset adjustment of the DC amplifier circuit in a closed loop configuration. This connection provides an automatic reduction in the light source intensity as required to avoid saturation. Further, this is accomplished without sacrificing amplifier gain, so that the dynamic operating range of the photosensor is extended to include proper operation at very bright light levels. The EDR control circuit also includes an indicator circuit that is connected to the light intensity control circuit. The indicator circuit provides the user an indication of where in the overall dynamic range of the photosensor the offset adjustment of the DC amplifier has been set.

31 Claims, 6 Drawing Sheets

PHOTOELECTRIC SENSOR HAVING AN ENHANCED DYNAMIC RANGE CONTROL CIRCUIT

This is a continuation application of application Ser. No. 08/337,619 filed Nov. 10, 1994 abandoned.

FIELD OF THE INVENTION

The present invention relates to photoelectric sensing devices, and in particular is directed to a photoelectric sensor ("photosensor") that is uniquely capable of resolving difficult low contrast sensing tasks by adjustment of the sensor's light source intensity, so as to prevent dark state saturation and extend the overall dynamic range of the sensor.

BACKGROUND OF THE INVENTION

The starting point of the present invention is disclosed in U.S. Pat. No. 4,644,341 to Warner, which is incorporated herein by reference. That patent generally describes a photosensor utilizing a contrast indicating arrangement and LED bargraph display to give a visual indication of the light level returned to the photosensor as detected in the light and dark states. The difference between the maximum (light) reading on the bargraph display and the minimum (dark) reading on the bargraph display is termed the "contrast differential."

The determination of the contrast differential is important to a photosensor's successful performance, as the proper adjustment of the photosensor during operation is largely dependent on this determination. In particular, during sensing tasks where the difference between the "light" and "dark" states is very small, the precise adjustment of the photosensor is critical. For example, consider the situation where the presence of metal washers on screws are being detected by the photosensor. The difference between the returned light levels from the presence of the washers as compared to the absence of the washers is very small. Thus, it is desirable to adjust the operation of the photosensor (by manipulation of the photosensor's gain or bias controls) so as to "increase" the difference in the returned light levels between the presence and absence of the washers. And, it is desirable that this adjustment take place during ongoing sensing tasks, such that shutdown of the sensing system or other such industrial application (which can be very costly) due to faulty photosensor performance is avoided.

The invention disclosed in the aforementioned U.S. Pat. No. 4,644,341 was designed to facilitate proper adjustment of a photosensor's performance during operation. To accomplish this, a pulse modulator circuit is connected to the sensor's light source (typically an LED). Reflected light is received by a light sensor (typically a photo diode or photo transistor). The received light is amplified and then demodulated by a peak detector circuit. After filtering, the received light signal is impressed on a DC amplifier circuit, which outputs an analog DC signal. Preferably this analog DC signal is directly proportional to the intensity of the received light.

The analog DC signal is then input to the LED bargraph display, thereby giving an indication of the available light contrast to the user. If adjustments to the sensor need to be made, the gain and bias of the DC amplifier circuit (which are typically variable resistors) are exposed on the outside of the photosensor for manual adjustment. Thus, by examining the intensity of the received light (as embodied by the analog DC signal) on the bargraph display, the user is able to adjust the photosensor in such a way as to achieve maximum operating performance.

While the foregoing invention provided a marked improvement in the reliability and operation of photosensors, it has limitations in the area of extremely low contrast sensing tasks. Every photosensor has a "saturation point;" that is, the point at which any further increase in received light by the light sensor will not result in any further increase in the magnitude of the internal signal. This would be apparent from the photosensor's bargraph display, in that a change in an object sensing task will not result in an increase in the signal level displayed by the bargraph.

An example may prove illustrative. Consider again the situation where the sensing task is to detect the presence or absence of metal washers on corresponding metal screws. If the background (i.e., the screw) is reflecting enough light to reach the photosensor's saturation point, the presence of the washer will not produce a change in the signal shown on the bargraph display. Of course, in such a situation, the photosensor is not performing its sensing task.

The undesirable situation described above is referred to as "dark state saturation." One of the goals of the present invention, therefore, is to provide a photosensor which substantially avoids the dark state saturation condition and enhances background reflection suppression.

Conventional techniques for accomplishing these goals have a number of limitations. For example, in the above-described photosensor, the amplifier gain must be reduced to operate the photosensor in bright received light conditions. Reducing the photosensor's amplifier gain, however, necessarily minimizes the sensor's ability to perform low contrast sensing tasks. Accordingly, the performance of the photosensor is compromised.

Other potential solutions in the prior art are also not acceptable. For example, it has been proposed to turn down the intensity of the light source, or to replace the color of the light source with one of weaker intensity. These solutions, however, are not reliable, as they are only estimations of how much the light source intensity must be decreased in order to avoid entering saturation. Random adjustment of the light source intensity may result in the photosensor still entering saturation if the adjustment is not enough, or will result in overcompensation, such that the ability of the photosensor to perform low contrast sensing tasks is lessened.

One type of prior art system that adjusts the intensity of the light source is disclosed in U.S. Pat. Nos. 5,281,810 and 5,336,882. In this system a microprocessor is used to control the repetition rate and amplitude level of the current and resulting light pulses of the LED light source. The amplitude and pulse rate are adjusted together in order to avoid overloading the LED light source. The microprocessor responds to a pulse rate selected by the operator, in accordance with his or her particular response time and range needs. Of course, it is understood that as the pulse rate increases, the response time of the sensor improves but its overall sensing range decreases. This type of system allows the user the flexibility to select the most appropriate repetition rate depending on the particular sensing task.

While the system disclosed in the above-mentioned U.S. Pat. Nos. 5,281,810 and 5,336,882 provides many important advances in the photosensor field, it has its drawbacks. To begin with, the system is rather complex, requiring a sophisticated microprocessor for operation. While this system uses a comparison algorithm to automatically adjust the gain of the amplifier in response to reflected signals that are below a threshold value or are approaching saturation, this system does not adjust the input light intensity in direct response to an approaching saturation condition. Instead, this system adjusts the gain of the amplifiers. The system in the above-referenced patents therefore does not disclose a photosensor which varies the transmitted light intensity in response to adjustment of the offset of the DC amplifier. While this prior art system does utilize an LCD display to transmit system information to the user, it does not disclose the use of a easy-to-understand visual indication of when the photosensor is operating within its intended dynamic range, as will be described below in accordance with the present invention.

Returning to the problem at hand, other solutions known in the prior art for preventing dark state suppression, such as backing the photosensor away from the object sensing field, or changing the diameter of the light source fiber optics, or reducing amplifier gain are also not suitable. These solutions will reduce the photosensor's ability to perform low contrast sensing tasks, and therefore compromise the sensor's performance ability.

Many of the above-proposed solutions are also not acceptable because photosensors typically do not have a fixed saturation point. Photosensors must be versatile enough to perform in a variety of sensing tasks, which therefore require the sensor to have the ability to detect numerous different changes in contrast. Any of the above-described adjustments, thus, will reduce or significantly degrade the photosensor's ability to perform difficult low contrast sensing tasks. The capability of the photosensor to adapt to a wide variety of contrasting light levels is also diminished, without constant "trial and error" adjustment. Also, because many photosensors are located such that the fiber-optics must be in a fixed position, the above-described adjustments will all detrimentally effect the response of the photosensor in some way.

Accordingly, there exists a need in the photosensor industry for a photosensor that can resolve low contrast sensing tasks over a wide range of light intensities, and still maintain proper operation during high reflected light levels. It is also desirable to develop a photosensor that may be adjusted to avoid reaching the saturation point without sacrificing amplifier gain. Further, there exists a need for a photosensor that provides the user with an indication of when the photosensor is either approaching saturation or operating under very low received light conditions, so that an appropriate performance adjustment may be made to keep the photosensor operating within dynamic operating range, thereby ensuring that contrast deviation response is maximized.

SUMMARY OF THE INVENTION

It is an object of the present invention to solve the dark state saturation problem present in the photosensor industry and provide a photosensor that automatically reduces the input light source intensity as required, thereby avoiding saturation.

It is another object of the present invention to accomplish the goal of avoiding saturation without sacrificing amplifier gain (DC or pre-amplifier stages), so as to ensure that the ability of the photosensor to resolve low contrast sensing tasks is not compromised. The present invention extends the overall dynamic operating range of the photosensor, in that the photosensor can operate under high reflected light levels, without requiring a reduction in amplifier gain.

It is a further object of the present invention to provide a photosensor that gives the user a visual indication of when the photosensor is operating at either end of received light extremes (i.e., approaching saturation or operating under very low received light), such that the user may make suitable performance enhancement adjustments to ensure the photosensor operates within its dynamic range at all times.

It is another object of the present invention to provide a photosensor that achieves the above-described objects in both proximity and beam-break modes.

Yet another object of the present invention is to provide a photosensor that, when operating in the proximity mode, is capable of using divergent fiber-optics, thereby providing a wider field of view for the photosensor. Of course, the greater the field of view, the greater the contrast deviation of the photosensor.

In order to accomplish the above-described advantages, the present invention utilizes a pulse modulator, driver circuit, and light source for transmitting light to the target or sensing area. Reflected or transmitted light from the target is received by a light sensor. The received light signal is then amplified, demodulated, and filtered by appropriate circuit components. This signal is then passed through a DC amplifier circuit, to provide an analog DC signal, which is preferably proportional to the received light. The analog DC signal then is presented to a user in three ways: preferably through an LED bargraph display, where it is displayed in quantitative form to the user, who is afforded a visible indication of the contrast between the light and dark states of the target; to a voltage comparator and corresponding output interface circuit, for digital switching applications; or directly to termination, where it becomes available for any analog control purpose.

The present invention further utilizes an enhanced dynamic range (EDR™) control circuit. (EDR is a trademark of Tri-Tronics Company, Inc., the assignee of the present application.) The EDR control circuit combines the light source and offset adjustment of the DC amplifier circuit in a unique closed loop configuration. This connection provides an automatic reduction in the light source intensity as required to avoid saturation. Further, this is accomplished without sacrificing amplifier gain, so that the dynamic operating range of the photosensor is extended to include proper operation at very bright light levels.

The EDR control circuit operates in the following manner. A light intensity control circuit is located between the pulse modulator and the light source, and controls the LED driver circuit. This light intensity control circuit is connected in a closed loop fashion to the offset adjustment of the DC amplifier circuit. The offset adjustment is preferably built into the photosensor housing. To avoid dark state saturation and enhance background light suppression, the light intensity control circuit monitors the offset adjustment of the DC amplifier circuit during photosensor set-up, in order to determine when the sensor's operating level is approaching the sensor's saturation point. Before saturation occurs, the light intensity control circuit automatically adjusts the photosensor's light source intensity, through the LED driver circuit, so as to prevent dark state saturation and extend the overall dynamic range of the photosensor.

Thus, it is apparent that the light intensity control circuit allows the gain of the AC and/or DC amplifier to be preset at a maximum level. Use of the light intensity control circuit thereby allows the photosensor to resolve low contrast sensing tasks over a wider range of light intensities, including proper operation at high reflected light levels.

The EDR control circuit also includes an indicator circuit that is connected to the light intensity control circuit and is preferably built into the photosensor housing. The indicator circuit (termed the "EDR™ indicator") provides the user an indication of where in the overall dynamic range of the photosensor the offset adjustment of the DC amplifier has been set. As the offset adjustment is rotated, so as to increase the offset voltage, the indicator circuit (typically an LED) will begin to dimly glow. As the offset adjustment is manipulated during the set-up process to obtain maximum contrast deviation, the intensity of the emitter light source will vary. If the offset voltage is increased so as to subtract bright background or very bright target signals from the DC amplifier, the intensity of the emitter light source will decrease, and the intensity of the indicator circuit LED will increase. Thus, upon simple visual inspection of the indicator circuit LED, a user will know if the intensity of the emitter light source is being increased or decreased (via manipulation of the offset adjustment control of the DC amplifier) to optimize sensor performance.

If after initial modification of the offset adjustment (to obtain maximum contrast deviation) the indicator circuit LED is off or barely lit, the user will know the photosensor is operating under very low received light conditions. If, on the other hand, the indicator circuit LED is fully lit, the photosensor is operating under very high received light conditions. Accordingly, the user need only manipulate the offset adjustment, or alternatively make certain performance enhancements, such that the indicator circuit LED is not fully lit or completely off. Anywhere in between, resulting in a steady glow, indicates that the photosensor is operating within its dynamic operating range.

In addition to varying the offset adjustment of the DC amplifier circuit, it is of course possible to make other performance enhancement adjustments during operation in response to the indicator circuit. For example, if the indicator circuit LED is off, the user knows the photosensor is operating near its maximum sensing range. Typical performance enhancements in response to this knowledge would be to, for example, move the sensor closer to the target, or use larger diameter fiber-optic light guides. Oppositely, if the indicator circuit LED is fully lit, the user knows the sensor is operating near saturation. Performance enhancements in that case would include moving the sensor away from the target, or downsizing the diameter of the fiber-optics. In each case, the above-described performance enhancements will ensure that the contrast deviation response of the photosensor has been maximized.

The present invention, including all attendant features and advantages, will be best understood by reference to the following detailed description of the invention, taken in conjunction with the accompanying drawings.

DETAILED DESCRIPTION OF THE PREFERRED EMBODIMENTS

Figure 1:
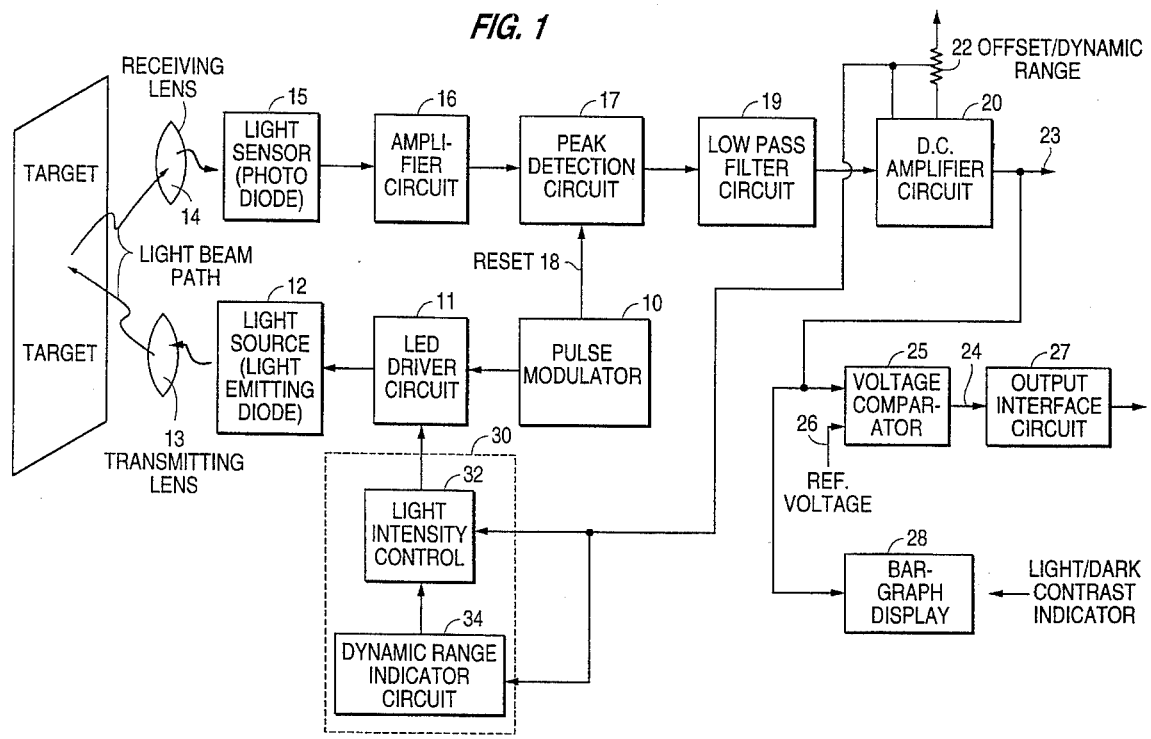
FIG. 1 is a block diagram of the circuit of the photosensor of the present invention.

Turning now to the drawings, FIG. 1 depicts a block diagram circuit of the photosensor of the present invention. The light transmitting portion of the photosensor consists of the LED driver circuit 11 and emitter light source 12, which is typically a light emitting diode (LED). The light produced by the light source 12 is modulated at a high frequency by a pulse modulator circuit 10. The use of the pulse modulator circuit 10 substantially eliminates the effects of ambient light during photosensor operation.

The pulse modulated light from the light source 12 is emitted through the transmitting lens 13, where it is directed towards the target to be detected. Light reflected from the target impinges upon the receiving lens 14, which focuses the reflected light on the light sensor 15 (typically a photodiode or a photo transistor). The signal output from the light sensor 15 is amplified by amplifier circuit 16, and then demodulated by the peak detector circuit 17. The peak detector circuit 17 has a reset input 18 from the pulse modulator circuit 10. The output signal from peak detector circuit 17 is passed through the low pass filter circuit 19, which eliminates the high frequency components therefrom.

The demodulated, filtered output of the low pass filter circuit 19 is then impressed on the DC amplifier circuit 20, which produces the output analog DC signal 23. The analog DC signal 23 is preferably directly proportional to the intensity of the light received by the light sensor 15.

It is intended that the present invention is applicable to either analog or digital embodiments. Thus, in the analog version, the analog DC signal 23 terminates, and is available for any analog control purpose that may be desired in a given application. In the digital version, the analog DC signal is internally connected to the input of a voltage comparator 25, which has as its other input a reference voltage 26. Thus, a digital output signal 24 may be produced by the voltage comparator 25 the moment the analog output reaches a given threshold level. The digital output signal 24 from the voltage comparator 25 (which is either an "on" or "off" signal) is presented to an output interface circuit 27, which performs whatever switching application is desired.

In both the analog and digital versions, the analog DC signal 23 is preferably impressed on the bargraph display 28. The bargraph display 28 gives the user an indication of the contrast between the light and dark states. Of course, it should be understood that the bargraph display 28 is not necessary for operation of the described system, but is only part of the preferred embodiment.

The EDR control circuit 30 of the present invention comprises the light intensity control circuit 32 and the dynamic range indicator circuit 34. The light intensity control circuit 32 is located between the pulse modulator circuit 10 and the light source 12, so as to control the LED driver circuit 11, and is connected in closed-loop fashion to the offset adjustment 22 of the DC amplifier circuit 20. The light intensity control circuit 32 monitors the offset adjustment 22 during photosensor set-up to determine when the sensor's operating level is approaching the saturation point. Before saturation occurs, the light intensity control circuit 32 automatically reduces the intensity of the light source 12 (via the LED driver circuit 11) in an analog manner in response to the setting of the offset adjustment 22. Thus, the EDR control circuit 30 of the present invention prevents dark state saturation from occurring, and extends the overall dynamic range of photosensor. Further, the EDR control circuit 30 allows the photosensor to resolve low contrast sensing tasks over a wider range of light intensities, including proper operation at high light levels.

In addition, the EDR control circuit 30 contains a dynamic range indicator circuit 34, which is preferably built into the photosensor housing. The dynamic range indicator circuit 34, which is preferably an LED, provides the user with an indication of where in the overall dynamic range of the photosensor the offset adjustment 22 has been set. For example, if after adjustment to obtain maximum contrast deviation the dynamic range indicator circuit 34 is off (i.e., the LED is not glowing), the photosensor is operating under very low received light conditions. If the dynamic range indicator circuit 34 is fully lit, the photosensor is approaching saturation, i.e., operating under very high received light conditions.

Accordingly, it is apparent that the dynamic range indicator circuit 34 provides the user with a simple way of determining if the photosensor is operating within its dynamic operating range. That is, after adjustment of the photosensor, the dynamic range indicator circuit 34 should not be fully lit or completely off. Anything in between, such as a steady glow, indicates to the user the photosensor is working within its dynamic operating range.

When the dynamic range indicator circuit 34 is at one of the two extremes, the user may make performance enhancement adjustments during operation in response to the dynamic range indicator circuit 34. As previously stated, if the dynamic range indicator circuit LED 34 is off, the photosensor is operating near its maximum sensing range. When the photosensor is operating in the proximity mode, suitable performance enhancements in response would be to move the sensor closer to the target. If the sensor is operating in a retro-reflective or beam-break mode, a performance adjustment would be to reduce the distance between the light source fiber and receiver fiber. In either mode, one could also use larger diameter fiber-optic light guides.

If the dynamic range indicator circuit LED 34 is fully lit, the photosensor is operating near saturation. Typical performance enhancements in that case (in a proximity mode) would include moving the photosensor away from the target. In a retro-reflective or beam-break mode, a performance adjustment would be to increase the distance between the light source fiber and receiver fiber. In either mode, using smaller diameter fiber-optics would also be a suitable adjustment.

In either situation, these performance enhancements help ensure that the contrast deviation response of the photosensor has been maximized. Of course, it should be understood that the dynamic range indicator circuit 34 will typically draw current in order to light the LED. Therefore, the dynamic range indicator circuit 34 will have an effect on the amount of offset voltage which is presented to the light intensity control circuit 32, as depicted in FIG. 1.

The photosensor depicted in FIG. 1 provides unique performance benefits when functioning in either proximity or beam break modes of operation. When operating in proximity mode, the photosensor does not require the use of convergent or triangulating optics to sense objects resting on shiny or highly reflective backgrounds. Instead, the optics used with the present photosensor may be divergent, such as wide angle proximity lens or large bundle fiber optic light guides, thereby allowing a wider field of view for the sensor. Of course, the greater the viewing area of the photosensor's optics, the greater the contrast deviation. The use of divergent optics provides desirable performance benefits, as convergent or triangulating optics result in pinpoint spots of light. Thus, these types of optics may result in falsely switching the photosensor's output by responding to minute surface variations or imperfections in the sensed object. The wider field of view offered by divergent optics allows the present photosensor to overlook most minor surface irregularities. As a simple example, when attempting to sense the presence of chocolate chip cookies passing by on a white conveyor belt, the use of divergent optics will help ensure the photosensor does not falsely respond to a single chocolate chip.

Of course, the use of divergent optics also means that the intensity of the received light by the photosensor will increase. This, of course, means that the potential for the photosensor to enter saturation increases. Thus, the present invention's ability to reduce the light source intensity as the photosensor nears saturation makes it especially suitable for use with divergent optics.

Further, triangulating optics are designed to be extremely position sensitive. Often the position or location of objects will shift as they are conveyed past the sensing sight. Photosensors that rely on triangulating optics with such position sensitivity may not be capable of responding to such position variations. The photosensor of the present invention, which enables the use of divergent optics, therefore routinely outperforms triangulating sensors by accommodating minor variations in location or position.

The photosensor of the present invention, employing the EDR control circuit 30, also avoids dark state saturation when operating in the beam break mode of sensing. This is advantageous when attempting to detect the presence of splices, overlapping materials, container contents, or adhesive labels on backing materials. In particular, dark state saturation is liable to occur when the objects to be sensed are translucent or transparent. For example, in label detection, if the intensity of light penetrating through the label has reached the saturation level of the photosensor, the arrival of the gap between labels will not increase the signal level as displayed on the bargraph display 28. Thus, detection of the label is not possible. The EDR control circuit 30 of the present invention prevents this type of undesirable saturation from occurring by properly adjusting the light source intensity of the photosensor during set-up.

Figure 2A:
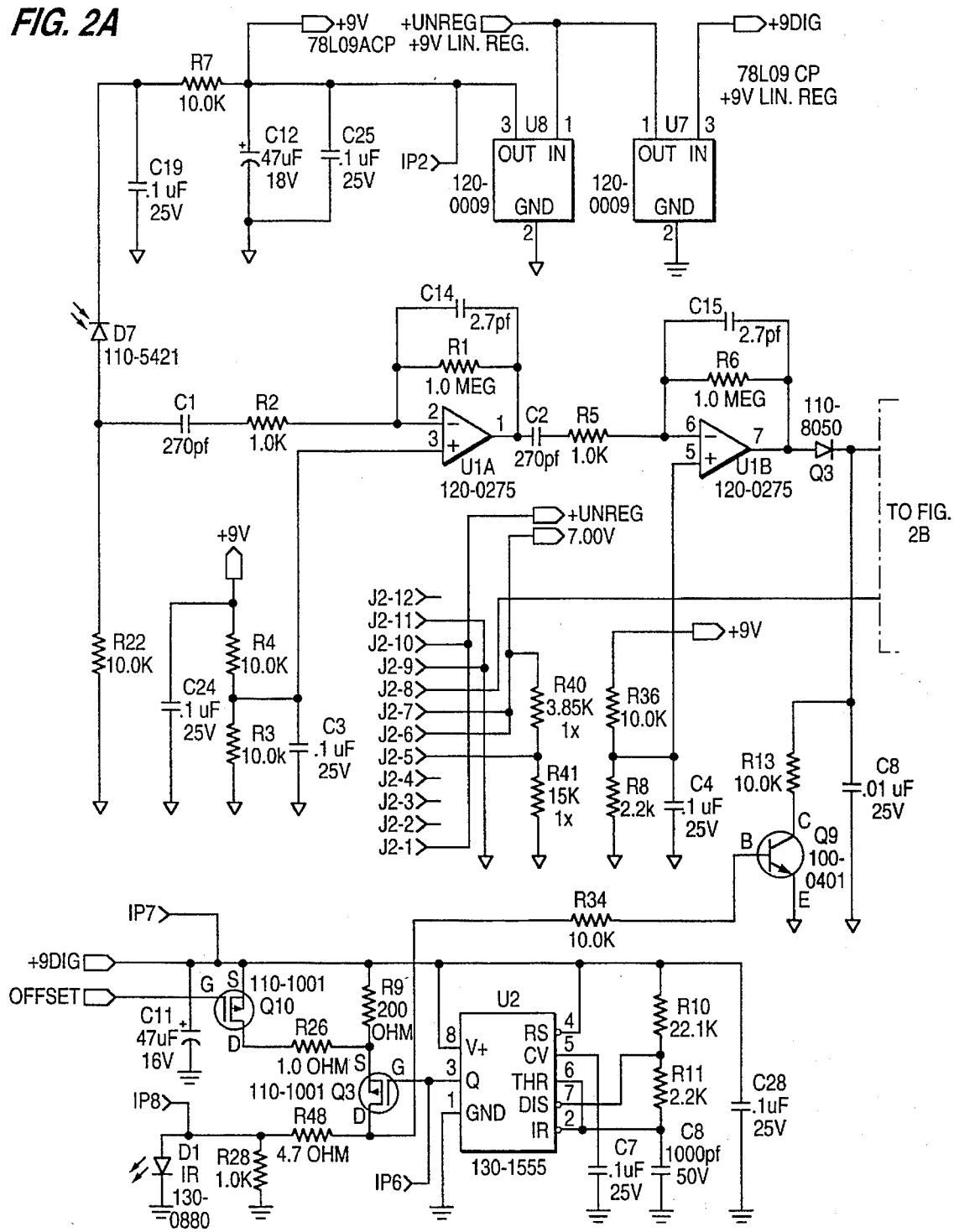
FIG. 2 is a schematic diagram of the circuit depicted in block form in FIG. 1.
Figure 2B:
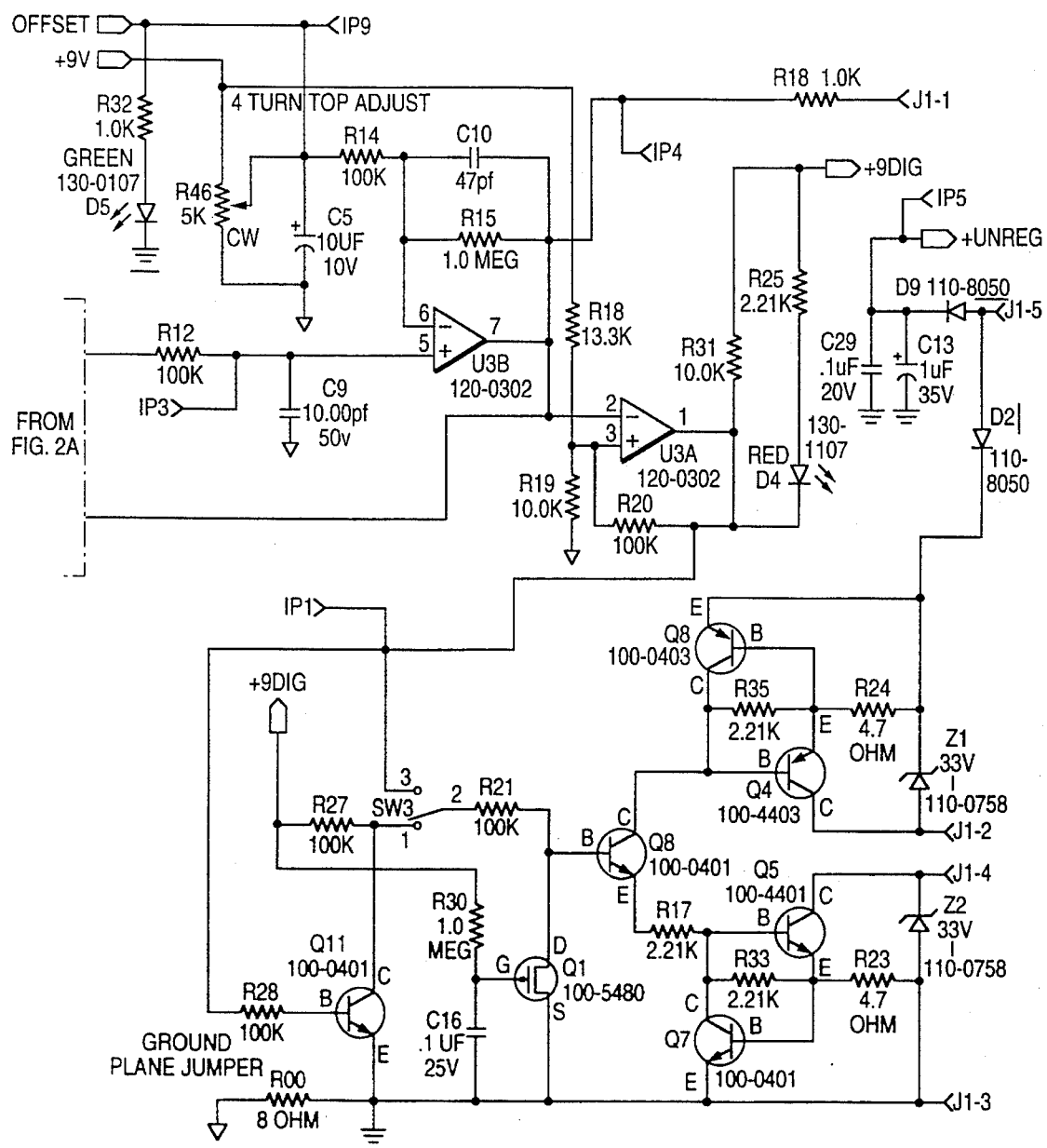

Turning now to FIG. 2, a schematic level diagram of the photosensor depicted in FIG. 1 is shown. The pulse modulator 10 from FIG. 1 comprises resistors R10 and R11, capacitors C6, C7, and C26, and 555 timer U2. The LED driver circuit 11 comprises resistor R9, transistor Q3, and resistor R48. The light source 12 is D1, which emits light at a frequency determined by the pulse modulator.

The emitted or reflected light is received by the light sensor 15, which in FIG. 2 is element D7, a photodiode. The received light passes through the amplifier circuit 16, which here comprises two AC amplifiers in series. The first AC amplifier is comprised of capacitor C1, resistor R2, capacitor C14, resistor R1, and operational amplifier U1A. It should be understood that the AC amplifier acts as a high pass filter for the incoming light signal, in that it filters out the effects of any ambient light from the photosensor application area. Appropriate bias circuitry (resistors R3, R4, R22 and capacitors C24 and C3) set the voltage level of the signal entering the AC amplifier halfway between the single supply value (here, 9 volts) and ground.

The second AC amplifier is similar to the first, comprising capacitor C2, resistor R5, capacitor C15, resistor R6, and operational amplifier U1B. Bias circuitry is also associated with the second AC amplifier (resistors R40, R41, R36, R8, and capacitor C4).

The peak detector circuit 17, which demodulates the signal from pin 7 of the second AC amplifier, comprises the diode D3 and the capacitor C8. A reset 18 is connected to the peak detector circuit 17, and is driven by the output of pin 3 from the pulse modulator 11. In FIG. 2, the reset 18 comprises resistor R13 and transistor Q9.

The signal from the peak circuit 17 enters a low pass filter circuit 19, which in FIG. 2 comprises resistor R12 and capacitor C9. This signal is then passed into a DC amplifier circuit 20, which is operational amplifier U3B. The output of operational amplifier U3B is at pin 7, and is an analog DC signal, proportional to the intensity of the received light at the light sensor 15 (photodiode D7).

The offset adjustment 22 of operational amplifier U3B is controlled by resistor R46, which is preferably a four-turn variable resistor. Associated with the offset adjustment 22 (resistor R46) and operational amplifier U3B is amplifier gain circuitry comprising resistors R14, R15 and capacitor C10. This circuitry takes the signal from the low pass filter circuit 19, subtracts the offset voltage as set by the offset resistor R46, and multiplies the result by the DC gain factor, as determined by the ratio of R15 and R14. The result is the analog DC signal presented at pin 7 of operational amplifier U3B.

As previously stated, the analog DC signal 23 at pin 7 of operational amplifier U3B may be presented to the user in a variety of ways. First, in an analog operation, the analog DC signal 23 terminates at pin 7 and is presented to the outside for whatever analog application is appropriate. Second, in digital applications, the analog DC signal 23 is presented at one input to a voltage comparator 25 (U3A in FIG. 2). The other input to the voltage comparator U3A is a reference voltage 26, which is set by resistors R18, R19. The voltage comparator 25 determines if the analog DC signal 23 has exceeded the reference voltage 26. If so, a diode D4 will light up, indicating the output analog DC signal has exceeded the reference voltage. The output of the voltage comparator 25 (which is the signal equivalent of "off" or "on") then enters a transistor network which is the output interface circuit 27. These transistors (Q11, Q1, 24, Q5, Q6 Q7, Q8) comprise a digital switching circuit which is suitable for the particular switching application needed by the user.

Third, in both digital and analog modes, the analog DC signal 23 is preferably presented to the bargraph display 28, which in the embodiment of FIG. 2 is a twelve bar LED display J2-1 through J2-12. The signal as shown on the bargraph display 28 gives an indication to the user of the available light contrast from the target to be sensed. It should be understood that while the present invention is best utilized in a contrast indicating photosensor, and a bargraph display is the preferred mode for displaying the difference in contrast, the present invention may also be used with any other visual performance monitoring device.

Returning to the figures, the EDR control circuit 30 of FIG. 1 is also represented in FIG. 2. The light intensity control circuit 32 comprises transistor Q10 and resistor R26. As can be seen in FIG. 2, the input gate of transistor Q3 of the driver circuit 11 is driven by the output signal from pin 3 of the pulse modulator 10, while the input gate of transistor Q10 of the light intensity control circuit 32 is driven by an input labelled "offset." It should be understood that this is the same signal as generated by the offset adjustment 22 of the DC amplifier circuit 20.

In operation, as the value of the offset increases, transistor Q10 will begin to turn off. As transistor Q10 turns off, current flow through transistor Q3 will decrease. Thus, current through the light source 12 (diode D1 in FIG. 2) will also decrease, and the intensity of the emitted light from diode D1 decreases. Thus, the intensity of the light source is dependent on the value of the offset of the DC amplifier, as explained above.

Also, the dynamic range indicator circuit 34 of EDR control circuit 30 is comprised of resistor R32 and diode D5 in FIG. 2. In the illustrated embodiment, diode D5 is a green LED. As shown, diode D5 is driven by the offset adjustment 22 (resistor R46), such that as the offset is turned up, the diode D5 will begin to glow. If the diode D5 is fully glowing, the user knows the photosensor is at or near saturation, and will then be able to make one or more of the performance enhancements described above. Accordingly, the diode D5 supplies a visual indication to the user of when the offset adjustment 22 is being altered.

Figure 3:
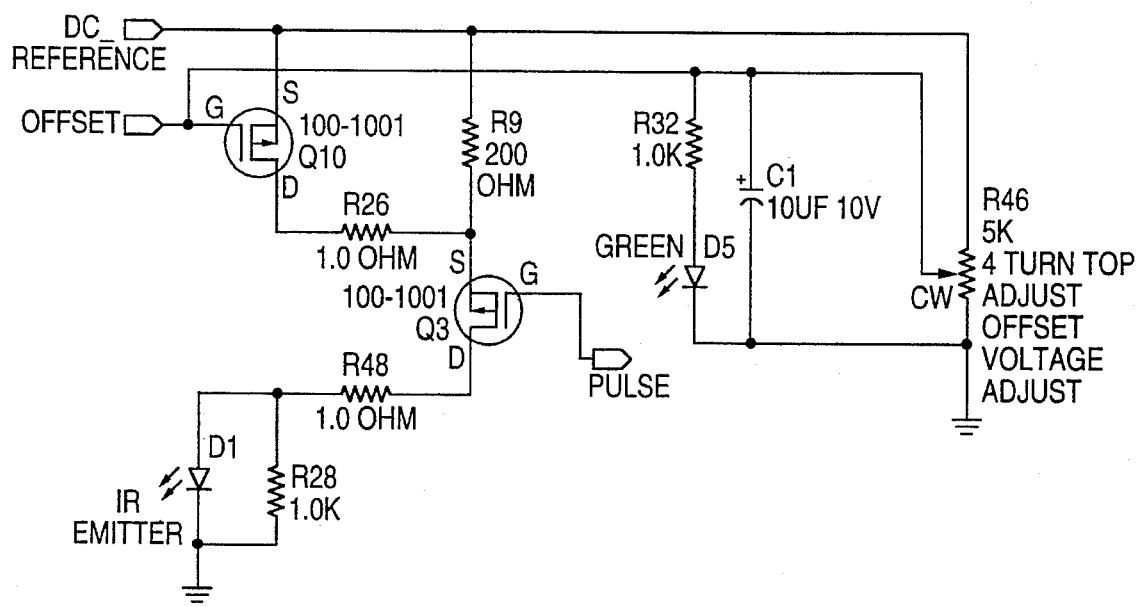
FIG. 3 is a schematic diagram of the preferred embodiment of the EDR control circuit of the present invention.

FIG. 3 highlights the preferred embodiment of the EDR control circuit 30 of the present invention as displayed in FIG. 2. As shown in FIG. 3, transistor Q10 and resistor R26 comprise the light intensity control circuit 32 of FIG. 1. The input gate of transistor Q3 of the driver circuit 11 is driven by an input labelled "pulse," which is generated by the pulse modulator 10. The input gate of transistor Q10 is driven by an input labelled "offset," which is fed from resistor R46, the offset adjustment 22 of the DC amplifier circuit 20. As the value of the offset increases, transistor Q10 begins to turn off, thereby decreasing current flow through transistor Q3. This therefore reduces the current through diode D1, which results in a decrease in the intensity of the emitted light from diode D1.

The dynamic range indicator circuit comprises resistor R32 and diode D5, the green LED in the preferred embodiment. This indicator circuit is also driven by the offset adjustment of the DC amplifier circuit, as explained above.

Figure 4:
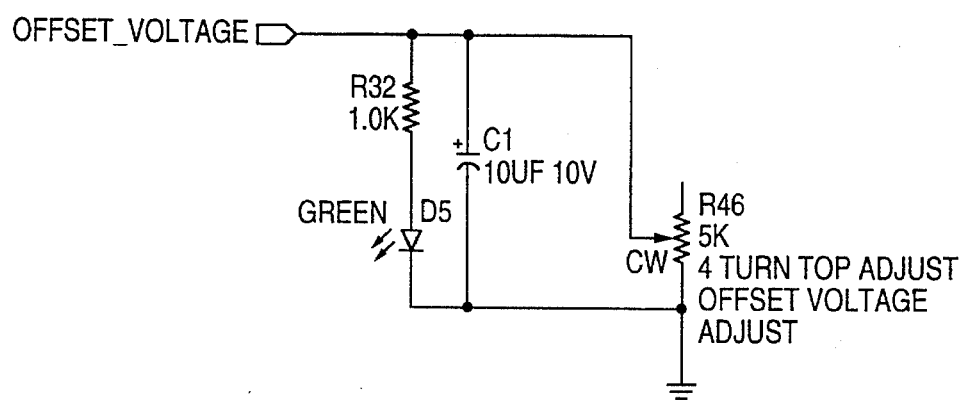
FIG. 4 is a schematic diagram of the indicator circuit of the EDR control circuit of the present invention.

FIG. 4 illustrates the dynamic range indicator circuit 34 of FIG. 1 in isolation. The elements are the same as those shown in FIG. 3. Until a certain offset voltage range is reached, the green LED D5 will not glow. As the offset voltage increases, the LED will begin to glow. However, as the offset voltage is increased, it has previously been shown that the transistor Q10 of the light intensity control circuit 32 begins to turn off (see FIG. 3), which results in a decrease in current through transistor Q3 and subsequently through the light source LED D1. Thus, a glowing LED D5 is an indication to the user that the light intensity of the light source D5 has been decreased. If the LED D5 is fully lit, the user knows the photosensor is at or near saturation.

Figure 5:
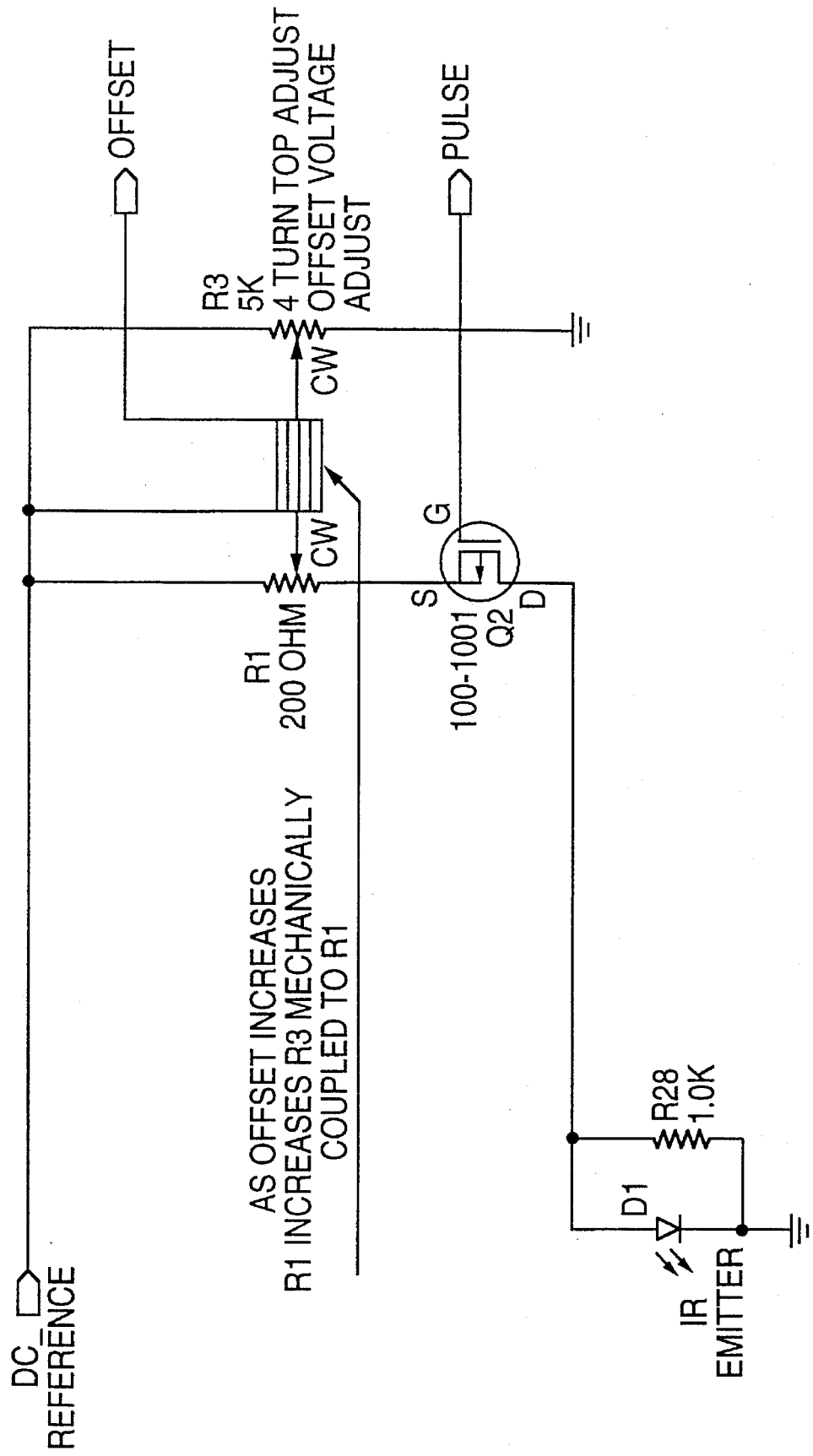
FIG. 5 is an alternate embodiment of the EDR control circuit of the present invention.

FIG. 5 illustrates an alternate embodiment of the light intensity control circuit 32 of FIG. 1. This embodiment may best be described as a linear control of the intensity of the light source. In this embodiment, resistors R1 and R3 form a variable resistor, with the two resistors being mechanically coupled together. Resistor R3 is a multi-turn adjustable resistor, as in the previous embodiment. As the offset increases, the value of resistor R1 also increases, such that the value of the variable resistance of R1 and R3 increases linearly with the offset voltage. Transistor Q2 acts as a switch, such that the linear change in resistance will result in a corresponding change in the current through the light source diode D1, and thus an increase or decrease in the intensity of the emitted light.

Figure 6:
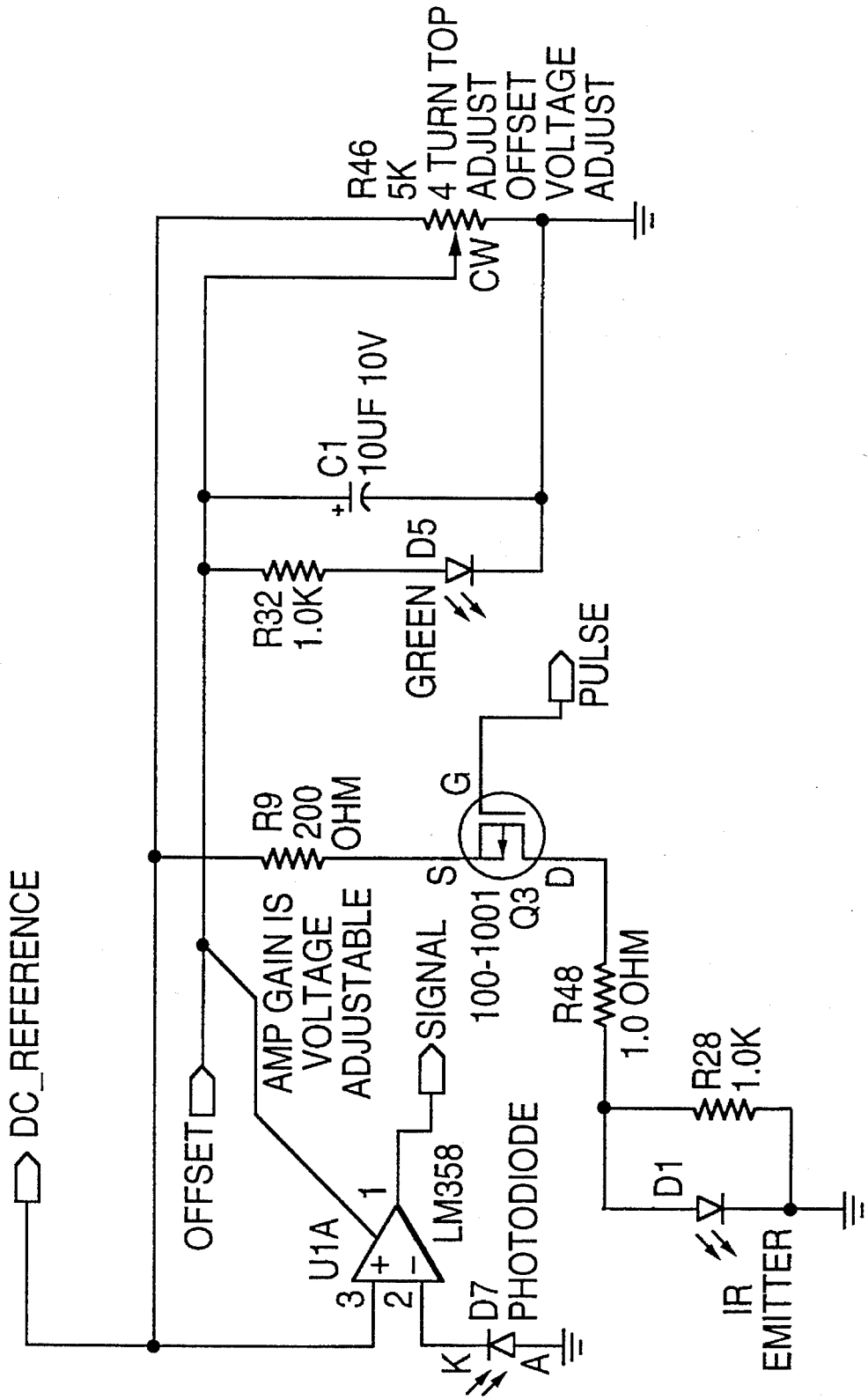
FIG. 6 is a schematic diagram of an offset to gain control circuit, which is another embodiment of the present invention.

FIG. 6 illustrates another alternate embodiment of the present invention. In FIG. 6, the amplifier gain of operational amplifier U1A is schematically coupled to the offset adjustment R46. Thus, the amplifier gain is voltage adjustable in accordance with a change in the offset value. Therefore, in this embodiment, it is not necessary to reduce the intensity of the transmitted light from the light source D1, because the received light signal intensity by photodiode D7 will be decreased upon passing through the operational amplifier U1A, whose gain is reduced in accordance with a change in the offset voltage.

The schematic diagrams of FIGS. 2–6 are considered to be illustrative and not limiting, and the illustrated values for the various circuit components are merely suggestive of acceptable values. Other values may also be workable. Further, it should be understood that such illustrated components as diodes, transistors, and LEDs have numerous equivalent elements in the photosensor and electrical engineering arts, and are accordingly only representations of acceptable components.

In addition, the present invention may be embodied in other specific forms without departing from the spirit or essential characteristics thereof. The present embodiments are therefore to be considered in all respects as illustrative and not restrictive, the scope of the invention being indicated by the appended claims rather than the foregoing description, and all changes which come within the meaning and range of equivalency of the claims are therefore intended to be embraced therein.

What is claimed is:

1. A photoelectric sensor comprising:
   a pulse modulator and light source for transmitting light at a sensing target;
   a light sensor for receiving reflected or transmitted light;
   a demodulator circuit for demodulating a light signal sensed by the light sensor;
   a DC amplifier for amplifying said light signal and outputting an analog DC signal which is proportional to the received light, said DC amplifier having an offset adjustment control;
   a display for supplying a visual indication of the intensity of the light received by said light sensor; and
   a control circuit coupled to the offset adjustment control of the DC amplifier for automatically preventing the photoelectric sensor from operating in dark state saturation by controlling the intensity of the light transmitted by the light source in an analog, non-linear manner,
   wherein the control circuit comprises a light emitting diode for supplying a visual indication of whether the photoelectric sensor is operating within its dynamic operating range.

2. The photoelectric sensor of claim 1 wherein the indicator comprises a light emitting diode.

3. The photoelectric sensor of claim 1 wherein the display comprises an LED bargraph display.

4. The photoelectric sensor of claim 1 wherein the offset adjustment control of the DC amplifier comprises a variable resistor.

5. The photoelectric sensor of claim 1 wherein the indicator supplies a visual indication of when the offset adjustment control is being altered.

6. The photoelectric sensor of claim 1 wherein the intensity of the light transmitted by the light source varies as the offset adjustment control is manipulated.

7. The photoelectric sensor of claim 1 wherein the offset adjustment control comprises a variable resistor that linearly increases in resistance as the offset adjustment control is increased, thereby decreasing the intensity of the light transmitted by the light source.

8. The photoelectric sensor of claim 1 wherein the photoelectric sensor is operating in a proximity mode.

9. The photoelectric sensor of claim 1 wherein the photoelectric sensor is operating in a beam-break mode.

10. A photoelectric sensor comprising:
    a pulse modulator and light source for transmitting light at a sensing target;
    a light sensor for receiving reflected or transmitted light;
    an amplifier circuit for amplifying a light signal received by the light sensor;
    a demodulator circuit for demodulating the light signal output from the amplifier circuit;
    a DC amplifier for amplifying the light signal output from the demodulator circuit and outputting an analog DC signal which is proportional to the received light, said DC amplifier having an amplifier gain and offset adjustment control;
    a display for supplying a visual indication of the intensity of the light received by said light sensor; and
    a control circuit coupled to the offset adjustment control of said DC amplifier for automatically preventing the photoelectric sensor from operating in the dark state saturation by controlling the intensity of the light transmitted by the light source in an analog manner and comprising an indicator for supplying a visual indication of whether the photoelectric sensor is operating within its dynamic operating range,
    wherein the amplifier gain of the DC amplifier is coupled to the offset adjustment control, such that the amplifier gain varies when the offset adjustment control is altered.

11. The photoelectric sensor of claim 10 wherein the indicator comprises a light emitting diode.

12. The photoelectric sensor of claim 10 wherein the display comprises an LED bargraph display.

13. The photoelectric sensor of claim 10 wherein the offset adjustment control of the DC amplifier comprises a variable resistor.

14. The photoelectric sensor of claim 10 wherein the indicator supplies a visual indication of when the offset adjustment control is being altered.

15. The photoelectric sensor of claim 10 wherein the photoelectric sensor is operating in a proximity mode.

16. The photoelectric sensor of claim 10 wherein the photoelectric sensor is operating in a beam-break mode.

17. A photoelectric sensor comprising:
    a pulse modulator and light source for transmitting light at a sensing target;
    a light sensor for receiving reflected or transmitted light;
    a demodulator circuit for demodulating a light signal sensed by the light sensor;
    a DC amplifier for amplifying said light signal and outputting an analog DC signal which is proportional to the received light, said DC amplifier having an offset adjustment control;
    a display for supplying a visual indication of the intensity of the light received by said light sensor; and
    a control circuit coupled to the offset adjustment control of the DC amplifier for automatically preventing the photoelectric sensor from operating in dark state saturation by controlling in an analog, non-linear manner the intensity of the light transmitted by the light source, such that the intensity of the light transmitted by the light source decreases as the offset adjustment control increases,
    wherein the control circuit comprises an indicator for supplying (1) a visual indication of whether the photoelectric sensor is operating within its dynamic operating range, and (2) a visual indication of when the offset adjustment control is being altered.

18. The photoelectric sensor of claim 17 wherein the indicator comprises a light emitting diode.

19. The photoelectric sensor of claim 17 wherein the display comprises an LED bargraph display.

20. The photoelectric sensor of claim 17 wherein the offset adjustment control of the DC amplifier comprises a variable resistor.

21. The photoelectric sensor of claim 17 wherein the offset adjustment control comprises a variable resistor that linearly increases in resistance as the offset adjustment control is increased, thereby decreasing the intensity of the light transmitted by the light source.

22. The photoelectric sensor of claim 17 wherein the photoelectric sensor is operating in a proximity mode.

23. The photoelectric sensor of claim 17 wherein the photoelectric sensor is operating in a beam-break mode.

24. A photoelectric sensor comprising:

a pulse modulator and light source for transmitting light at a sensing target;

a light sensor for receiving reflected or transmitted light;

a demodulator circuit for demodulating a light signal sensed by the light sensor;

a DC amplifier for amplifying said light signal and outputting an analog DC signal which is proportional to the received light, said DC amplifier having an offset adjustment control; and a control circuit coupled to the offset adjustment control of the DC amplifier for automatically preventing the photoelectric sensor from operating in dark state saturation by controlling in an analog, non-linear manner the intensity of the light transmitted by the light source, wherein the control circuit comprises a light emitting diode for supplying a visual indication of whether the photoelectric sensor is operating within its dynamic operating range.

25. The photoelectric sensor of claim 24 wherein the indicator comprises a light emitting diode.

26. The photoelectric sensor of claim 24 wherein the offset adjustment control of the DC amplifier comprises a variable resistor.

27. The photoelectric sensor of claim 24 wherein the indicator supplies a visual indication of when the offset adjustment control is being altered.

28. The photoelectric sensor of claim 24 wherein the intensity of the light transmitted by the light source varies as the offset adjustment control is manipulated.

29. The photoelectric sensor of claim 24 wherein the offset adjustment control comprises a variable resistor that linearly increases in resistance as the offset adjustment control is increased, thereby decreasing the intensity of the light transmitted by the light source.

30. The photoelectric sensor of claim 24 wherein the photoelectric sensor is operating in a proximity mode.

31. The photoelectric sensor of claim 24 wherein the photoelectric sensor is operating in a beam-break mode.

* * * * *